United States Patent [19]

Schmidt

[11] Patent Number: 4,525,551

[45] Date of Patent: Jun. 25, 1985

[54] HIGHLY ACTIVE AND EFFICIENT POLYOLEFIN CATALYST

[75] Inventor: Robert R. Schmidt, Longview, Tex.

[73] Assignee: Eastman Kodak Company, Rochester, N.Y.

[21] Appl. No.: 558,542

[22] Filed: Dec. 2, 1983

Related U.S. Application Data

[63] Continuation of Ser. No. 357,356, Mar. 12, 1982, abandoned.

[51] Int. Cl.$^3$ .......................... C08F 4/64; C08F 10/00
[52] U.S. Cl. .................................... 526/116; 502/107; 502/113; 526/348; 526/351; 526/352; 526/905; 585/512; 585/524
[58] Field of Search .................. 502/107, 113, 227; 526/116; 585/512, 524

[56] References Cited

U.S. PATENT DOCUMENTS

| 3,308,112 | 3/1967 | Ludlum | 526/116 |
| 3,328,381 | 6/1967 | Borman | 526/116 |
| 3,745,154 | 7/1973 | Kashiwa et al. | 526/116 |

FOREIGN PATENT DOCUMENTS

| 2012697 | 3/1970 | France | 526/116 |
| 1187466 | 4/1970 | United Kingdom | 526/116 |

*Primary Examiner*—Edward J. Smith
*Attorney, Agent, or Firm*—Clyde L. Tootle; Daniel B. Reece, III

[57] ABSTRACT

This invention relates to a novel highly active and more efficient catalyst system for polymerizing alpha-olefins to prepare high, medium, and low molecular weight polymers. This highly active olefin polymerization catalyst therefore can be used to prepare both olefin waxes as well as high molecular weight crystalline polyolefins. This highly efficient, highly active catalyst is prepared by reacting a vanadium tetrahalide with a titanium tetravalent member in a hydrocarbon medium. The product of this reaction is then combined with an activating component, such as triethyl aluminum, to form a highly active and efficient polyolefin catalyst.

24 Claims, No Drawings

HIGHLY ACTIVE AND EFFICIENT POLYOLEFIN CATALYST

This is a continuation of application Ser. No. 357,356 filed Mar. 12, 1982, now abandoned.

This invention relates to a novel process for preparing polyolefins. More specifically, the present invention relates to a particular anionic catalyst which can be used to prepare both high and low molecular weight polymers. The catalyst is prepared by reacting a vanadium tetrahalide with a titanium tetravalent member in a hydrocarbon medium. The product of this reaction is then combined with an activating component, such as triethyl aluminum, to form a high efficiency polyolefin catalyst.

Heretofore, there has been a tremendous amount of work carried out to develop processes for preparing polyolefin compositions of matter. Most of this work has been carried out in developing more efficient processes for making high molecular weight polyethylene, polypropylene, copolymers and the like. These processes are directed to improving the total polymer yield as well as improved crystallinity for polypropylene and high alpha-olefin polymers. Both of these two types of improvements are significant advances in the state of the art.

In preparing the lower molecular weight polyolefin waxes, work has generally been directed towards two general methods of preparation. One method is to degrade the higher molecular weight polymeric material. Another method requires the use of large amounts of hydrogen during monomer polymerization. The degradation process requires equipment, energy and labor which is undesirable. The use of large excess amounts of hydrogen is also undesirable due to a decrease in polymerization activity and an increase in hydrogenation of monomer feedstock. Therefore, to provide a unique highly active and efficient polyolefin polymerization catalyst, and processes using such catalyst, which can produce both polyolefin waxes and high molecular weight polymers would also be a significant advance in the state the art.

In accordance with this invention, it has been discovered that a highly active and efficient anionic coordination catalyst can polymerize alpha-olefin monomers, or mixtures of such monomers, to form polyolefins having a variety of molecular weights. For example, polyethylene waxes can be directly prepared with such catalyst and the same catalyst can be used to prepare high molecular weight moldable polyethylene and highly crystalline high molecular weight polypropylene and highly crystalline high molecular weight ethylene and propylene containing copolymers. The present catalyst and process therefore provide a unique catalyst system which can be used to prepare a whole family of polymeric products in highly efficient and improved yields.

The catalyst used in preparing this family of polyolefin products is prepared by heating vanadium tetrahalides, preferably vanadium tetrachloride, and a tetravalent titanium compound having an empirical formula $Ti(R)_aX_{4-a}$ where R is alkoxy or aryloxy and X is a halide preferably Cl, BR or I, and a is 0 to 4, preferably titanium tetrachloride, in the presence of a hydrocarbon medium. The hydrocarbon medium is essential to the formation of the catalyst of this invention. In the absence of the hydrocarbon medium, a product is formed which has a much lower catalytic activity. The hydrocarbon medium can be a branched or unbranched aliphatic or aromatic hydrocarbon containing from 1 to 18 carbon atoms or higher, preferably 6 to 12 carbon atoms. Halogenated hydrocarbons can be used provided such halogenated hydrocarbons contain at least one carbon-hydrogen bond. It is necessary that the hydrocarbon be in liquid form during catalyst preparation. Therefore, the molecular weight of the hydrocarbon must be high enough to prevent the hydrocarbon from vaporizing at the temperature used in preparing the catalyst. Examples of hydrocarbon media useful in the present invention are propane, pentane, hexane, heptane, octane, dodecane, benzene, toluene, mineral spirits, methyl chloride, methylene chloride, chloroform, ethyl chloride, ethylene dichloride, propyl chlorides, and the like. The hydrocarbon is present during catalyst preparation in an amount of 1 to 99 weight percent, preferably 5 to 50 weight percent, of the weight of the combined vanadium tetrahlide and titanium component. Aliphatic hydrocarbons such as mineral spirits are preferred due to the faster reaction time in forming the catalyst.

In addition, inorganic supports such as Mg and Mn halides or oxides and silicas or aluminas may optionally be present during the catalyst formation. The mole ratio of Ti to V used in preparation of the catalyst can vary from 1/3 to 60/1 with a preferred ratio of 1.5/1 to 10/1. The support may be present in amounts of 95 to 1 weight percent, preferably 5 to 25 weight percent. All reagents are charged to the reaction vessel under an inert atmosphere. Preferably the vanadium tetrahlide, Ti compound, and inorganic support, if desired, are charged to the vessel first followed by the hydrocarbon medium. After the hydrocarbon medium is added, the temperature of the mixture may raise to about 50° C. without external heating. The temperature of the mixture is maintained at 30° C. to 200° C. or greater, preferably 60° C. to 135° C., by external heating for a period of 0.25 to 6 hours, preferably 0.5 to 2 hours. The product is isolated by filtration under an inert atmosphere and the resulting solid can be washed with a hydrocarbon liquid such as pentane to remove any soluble vanadium or titanium components present in the resulting solid. The catalyst is black to light purple depending on the amount of support, if any, that is present.

When it is desirable to increase the titanium to vanadium mole ratio in the catalyst composition an alternate method for the preparation of the catalyst is to add the hydrocarbon and titanium compound to the reaction vessel and then add dropwise a mixture of either vanadium tetrahalide and the titanium compound or the vanadium tetrahalide and hydrocarbon medium. The catalyst is then prepared according to the process described in the previous paragraph.

To effect alpha-olefin polymerization a catalyst activator such as an organic aluminum component is added as cocatalyst. The aluminum component has the empirical formula $AlR_aX_{3-a}$ where R is alkyl, X is a halide, alkoxy, or aryloxy, and a is 1.5 to 3. Such compounds are, for example, trialkylaluminum compounds such as triethyl aluminum, dialkyl aluminum halides such as diethyl aluminum chloride and alkyl aluminum sesquihalides such as ethyl aluminum sesquichloride.

Hydrogen may be used to partially control molecular weight and may comprise 5 to 99 mole percent of the vapor phase. Small amounts of hydrogen can be used to control the molecular weight of high molecular weight polymers and larger amounts can be used in preparing low molecular weight waxes.

A mole ratio of aluminum to titanium and vanadium of 0.3/1 to 50/1 is especially satisfactory in the present process with 0.5/1 to 2/1 being the preferred mole ratios. When an inorganic support is used, the mole ratios of aluminum to titanium and vanadium should be in the same range.

The temperature of the polymerization is at least 125° C. to about 250° C., generally temperatures of 150° C. to 200° C. with the preferred range being 160° C. to 180° C. It can be advantageous to conduct the polymerization at high temperatures, i.e., 150° C. or greater. Most high activity catalysts lose activity very rapidly as the polymerization temperature is increased to about 150° C. or higher. Even catalysts that are used in solution polymerization processes rapidly have a reduction in activity as the polymerization temperature exceeds 175° C. The catalysts of this invention, however, have high activities at temperatures of 160° C. to 230° C. Therefore, the catalysts of this invention allow polymerizations to be conducted at much higher temperatures with greater catalytic activity than the prior art catalyst.

A suitable pressure range for the process includes, for example, pressures from about 100 kPa to about 500,000 kPa or more. Generally, it is preferred to use pressures in the range of about 500,000 kPa to about 14,000 kPa, most preferred 7,000–8,750 kPa.

Generally, a solvent or diluent is not necessary in the polymerization process and is used primarily as a carrier for the addition of the catalyst to the reactor. However, if a high molecular weight polymer is to be prepared, i.e., with a melt viscosity greater than 30,000 cp at 150° C., then it may be desirable to employ a solvent or diluent. Organic solvents which can be used for the addition of catalyst and diluent include, for example, aliphatic alkanes or cycloalkanes such as propane, pentane, hexane, heptane, cyclohexane, and the like, or hydrogenated aromatic compounds such as decahydronaphthalene, or aromatic hydrocarbons such as benzene, toluene, xylene, and the like. The nature of the solvent is subject to considerable variation but should be in a liquid form at the reaction conditions and essentially inert to the reactants and reaction products. A petroleum fraction of suitable boiling range such as odorless mineral spirits (a sulfuric acid washed paraffinic hydrocarbon boiling at 180°–220° C.) is a particularly good and preferred solvent or diluent.

Another important aspect of this invention is that homopolymers and copolymer waxes can be directly prepared in a continuous process at high temperature. The catalyst allows the synthesis of a given viscosity wax at a lower hydrogen concentration. This is beneficial in several ways: (1) the catalyst activity is higher at lower hydrogen concentrations and therefore less catalyst is required, (2) less hydrogenation of the olefins being polymerized occurs, and (3) hydrogen is very insoluble in the polymerization medium and only a small percentage reacts; therefore, with this catalyst less hydrogen would have to be purified and recycled. However, such homopolymers and copolymer waxes can also be prepared in a high temperature batch process.

The monomers used in preparing the polyolefins of the present invention are alpha-olefins containing 2 to 14 carbon atoms or greater, preferably 2 to 10 carbon atoms. One of these monomers can be polymerized to form homopolymers or mixtures of two or more monomers may be polymerized to form block or random copolymers or terpolymers. The preferred homopolymeric polymers are polyethylene and polypropylene. The preferred copolymeric polymers are the ethylene/propylene copolymers and the ethylene/$C_4$ to $C_8$ alpha-olefin copolymers and the propylene/$C_4$ to $C_8$ alpha-olefin copolymers. Such preferred copolymers are, for example, ethylene/propylene copolymers, ethylene/butene-1 copolymers, ethylene/pentene-1 copolymers, ethylene/hexene-1 copolymers, ethylene/heptene-1 copolymers, and ethylene/octene-1 copolymers. The corresponding propylene/$C_4$ to $C_8$ alpha-olefin copolymers are propylene/butene-1 copolymers and the like. The amount of ethylene present in the ethylene/propylene copolymers can vary from 1% to 99%. Likewise, the amount of ethylene and propylene present in the ethylene/$C_4$ to $C_8$ alpha-olefin copolymers and the propylene/$C_4$ to $C_8$ alpha-olefin copolymers can vary from about 99 to 10 percent, preferably 97 to 85 percent.

The melt viscosity of the homopolymer and copolymers can vary from 10 to 2,500,000 cp. at 150° C. and can be controlled by the amount of hydrogen added to the polymerization reaction and to a lesser degree by the reaction temperature. If molecular weight is controlled by the use of hydrogen, the present process uses less hydrogen than required by other catalyst systems. The preferred polyolefin waxes for use as coatings are 1,500–30,000 centipoise at 150° C. and more preferably 3,000–5,000 centipoise. For other applications such as blends with other polyolefins, wax melt viscosities above 10,000 are desirable. The specific quantity of catalyst required to obtain a desired product viscosity varies with several factors, such as reaction temperature, catalyst residence time in the reactor, the ratio of monomer to comonomer, and the overall conversion of monomer to polymer.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A. Preparation of Vanadium/Titanium Catalyst

This example shows the preparation of a vanadium/titanium catalyst of this invention.

Under an inert atmosphere, 209 grams of $VCl_4$, 345 grams of $TiCl_4$, and 100 ml of mineral spirits were charged to a 1,000-ml round bottom flask. The mixture was heated with stirring at 135° C. for two hours. After cooling to room temperature, the resulting solid was collected by filtration under an inert atmosphere and washed with pentane until no vanadium or titanium was in the pentane wash. The product was dried under a nitrogen stream. The yield was 214 grams of a black solid which contained 26.4 weight percent vanadium, 7.5 weight percent titanium, and 64.4 percent chlorine.

B. Catalyst Preparation Without Mineral Spirits

This example shows the effect of eliminating the hydrocarbon from the catalyst preparation.

Under an inert atmosphere, 209 grams of $VCl_4$ and 345 grams of $TiCl_4$ were heated with stirring as described in Example 1A except no mineral spirits was employed. The yield was 5 grams of a dark solid.

EXAMPLE 2

This example demonstrates a batch synthesis of ethylene-alpha-olefin copolymers with a catalyst of this invention. A 2-liter autoclave heated to 160° C. under nitrogen was charged with 1136 kilopascals (kPa) propylene and 300 ml mineral spirits. When the temperature had stabilized at 160° C., 0.015 gram of the catalyst of Example 1A and 0.053 gram of AlEt$_3$ were charged to the reactor in 500 ml of mineral spirits. The pressure was increased to 6,996 kPa with ethylene and maintained at 6,996 kPa for two hours by repressuring with ethylene as needed. After cooling, the product was isolated by precipitation and washing with acetone and drying under vacuum. The yield was 308 grams of product with a melt index of 0.38 and density of 0.910 grams per cubic centimeter. The activity based on total catalyst was 2,265 grams polymer per gram total catalyst per hour.

EXAMPLES 3-4

These examples demonstrate the effect of polymerization temperature on the catalysts of this invention. Polymerizations were carried out as described in Example 2 using the catalyst of Example 1A except at different temperatures. The results as well as those of Example 2 are in Table I.

TABLE I

| Ex. | Polymerization Temp., °C. | Polymer Yield, g | Melt Index | Density, g/cc | Catalyst Activity, g/g total cat./hr. |
|---|---|---|---|---|---|
| 2 | 160 | 308 | 0.38 | 0.910 | 2,265 |
| 3 | 200 | 133 | 0.11 | 0.918 | 1,630 |
| 4 | 230 | 102 | 0.38 | 0.920 | 747 |

As shown by Table I the catalysts of this invention have high catalyst activity at high polymerization temperatures.

EXAMPLE 5

This example shows that the new catalyst is different than a mixture of VCl$_3$ and TiCl$_3$. A polymerization of ethylene and propylene was carried out as described in Example 2 except 0.02 gram of a ball milled 3/1 mixture of VCl$_3$ and hydrogen reduced TiCl$_3$ (H-TiCl$_3$) was used as catalyst with 0.091 gram of AlEt$_3$. The yield was 241 grams of a product with a melt index of 1.85 and density of 0.916 gram per cubic centimeter. The activity based on total catalyst was 1.383 grams polymer per gram catalyst per hour or 61 percent of the activity obtained in Example 2.

EXAMPLE 6

This example shows the use of the catalyst of this invention for the continuous synthesis of an ethylene-alpha-olefin copolymer. The following materials were fed continuously into a pressure reaction vessel.

| | |
|---|---|
| Catalyst of Example 1A | 0.029 Gram/Hour |
| AlEt$_3$ | 0.108 Gram/Hour |
| Mineral Spirits | 2,394.0 Grams/Hour |
| Ethylene | 1,151.0 Grams/Hour |
| Propylene | 233.0 Grams/Hour |
| Hydrogen | 1.0 Gram/Hour |

The continuous polymerization was conducted at 195° C. and a pressure of 8,720 kPa. The average catalyst residence time was 4.3 hours. After gas and solvent removal, 1,410 grams per hour polymer was produced with a melt index of 18.2 and a density of 0.933 gram per cubic centimeter. The activity based on transition metal halide was 11,400 grams per gram catalyst per hour. The yield based on transition metal halide was 49,200 grams per gram catalyst.

EXAMPLE 7

A. Catalyst Preparation With Support and Mineral Spirits

This example demonstrates the preparation of a catalyst of this invention using a support.

Under an inert atmosphere, 5 grams of MgO, 86 grams of TiCl$_4$, 45 grams of VCl$_4$, and 25 ml of mineral spirits were heated as described in Example 1A. A black solid was obtained in a 55-gram yield. The product contained 16.6 weight percent vanadium, 5.8 weight percent titanium, 5.6 weight percent magnesium, and 55 weight percent chlorine.

B. Catalyst Preparation With Support and Without Mineral Spirits

This example shows the effect of eliminating the hydrocarbon from the preparation of a catalyst containing a support.

Under an inert atmosphere, 5 grams of MgO, 86 grams of TiCl$_4$, and 45 grams of VCl$_4$ were heated as described in Example 7A but in the absence of mineral spirits. The yield was 6.5 grams of a light purple solid.

EXAMPLE 8

This example shows that the catalyst of this invention may be used in the polymerization of propylene.

A 2-liter autoclave heated to 160° C. under nitrogen was charged with 400 ml mineral spirits and pressured to 2,170 kPa with propylene. When the temperature had stabilized at 160° C., 0.05 gram of the catalyst of Example 7A and 0.036 gram of AlEt$_3$ were charged to the reactor in 400 ml of mineral spirits. The pressure was increased to 6,996 kPa with propylene and maintained at 6,996 kPa by repressuring with propylene as needed. After cooling, the product was isolated by precipitation and washing with acetone. After stabilization with 0.5 percent tetrakis[methylene(3,5-di-tert-butyl-4-hydroxyhydrocinnamate)methane], the product was vacuum dried. The yield was 361 grams of polypropylene and the activity based on total catalyst was 2,096 grams per gram catalyst per hour. The product had a melt flow rate of 32.2 and a hexane index of 55.4.

EXAMPLE 9

This example shows that the stereoselectivity of propylene polymerizations with the catalysts of this invention can be improved by use of third components.

Propylene was polymerized as described in Example 8 using 0.05 gram of the catalyst in Example 1A, 0.036 gram AlEt$_3$ and 0.004 gram tetramethylethylene diamine. The yield was 145 grams of polypropylene and the activity based on total catalyst was 806 grams per gram catalyst per hour. The product had a melt flow rate of 3.7 and a hexane index of 74.9.

EXAMPLE 10

This example demonstrates that the prior art catalysts which contain only vanadium as the transition metal are not as effective as the catalysts of this invention. Propylene was polymerized as described in Example 8 using 0.1 gram of ball milled VCl$_3$ and 0.073 gram of AlEt$_3$. The yield was 29 grams of polypropylene. The activity based on total catalyst was 84 grams per gram catalyst per hour.

EXAMPLE 11

This example shows that the catalysts of this invention can also be used to prepare polyethylene waxes with low viscosities and in high yields.

A reactor was charged with 1 liter of mineral spirits, 0.15 gram of the catalyst of Example 1A, and 0.105 gram of AlEt$_3$ and heated to 160° C. The pressure was raised to 3,549 kPa with hydrogen then to 6,996 kPa with ethylene. Ethylene was fed to the reactor as it was consumed. The polymerization was terminated after 0.4 hour. The product was isolated by precipitation and washing with acetone and drying under vacuum. The yield was 363 grams of a wax having a viscosity of 35 cp at 150° C., a Ring and Ball softening point of 125° C., and a penetration hardness of less than 0.1 mm×10$^{-1}$. The activity based on total catalyst was 3,558 grams per gram catalyst per hour.

EXAMPLES 12-13

These examples show the effect of using the catalysts of Examples 1B and 7B which were prepared in the absence of a hydrocarbon. The same conditions were used as in Example 11. The results are summarized in Table II.

EXAMPLES 14-19

In Examples 14 through 19, catalysts of the prior art were used to prepare waxes under conditions described in Example 11 for comparison with the catalysts of this invention. These results are also summarized in Table II.

TABLE II

| Ex. | Catalyst/ Catalyst Activator | Activity, g/g catalyst/hr. | Melt Viscosity of Product at 150° C., cp$^a$ |
| --- | --- | --- | --- |
| 11 | Example 1A/AlEt$_3$ | 3,558 | 35 |
| 12 | Example 1B/AlEt$_3$ | 517 | 2,625 |
| 13 | Example 7B/AlEt$_3$ | 136 | 138 |
| 14 | AA-TiCl$_3$$^b$/AlEt$_3$ | 630 | 890 |
| 15 | AA-TiCl$_3$$^b$/AlEt OEt | 755 | 445 |
| 16 | AA-TiCl$_3$$^b$/AlEt$_2$Cl | 390 | 700 |
| 17 | HA-TiCl$_3$$^c$/AlEt$_3$ + LiBu | 1,060 | 6,120 |
| 18 | 9 Percent TiCl$_4$ on MgCl$_2$/AlEt$_3$ | 660 | 1,785 |
| 19 | MnCl$_2$ 2TiCl$_3$$^d$/AlEt$_3$ | 470 | 990 |

$^a$Measured on a Brookfield thermosel viscometer.
$^b$Aluminum reduced ball milled TiCl$_3$.
$^c$Hydrogen reduced ball milled TiCl$_3$.
$^d$Prepared by the reduction of TiCl$_4$ with manganese carbonyl.

EXAMPLE 20

This example shows that at high hydrogen pressures the catalysts of this invention yield very low viscosity waxes at high activities.

Using 0.15 gram of the catalyst in Example 7A and 0.105 gram of AlEt$_3$, an initial hydrogen partial pressure of 5,273 kPa and a total pressure of 6,996 kPa, ethylene was polymerized as described in Example 11. Two hundred eighty-eight grams of a wax with a viscosity of 20 cp was obtained. The wax had a Ring and Ball softening point of 123° C. and a penetration hardness of less than 0.1 mm×10$^{-1}$. The yield based on total catalyst was 1,129 grams per gram catalyst and the activity based on total catalyst was 1,026 grams per gram catalyst per hour.

EXAMPLE 21

This example shows that ethylene-alpha-olefin copolymer waxes can be prepared with the catalysts of this invention.

To a polymerization vessel were charged 1 liter mineral spirits, 0.05 gram of the catalyst in Example 7A and 0.035 gram of AlEt$_3$ and the mixture heated to 160° C. The pressure was raised to about 2,170 kPa with hydrogen. Ethylene and 75 grams of propylene were charged to adjust the pressure to 6,996 kPa. Ethylene was fed to the reactor as it was consumed. After 1.25 hours, 621 grams of wax was obtained with a viscosity of 525 cp at 150° C. The wax had a Ring and Ball softening point of 123° C. and a penetration hardness of 3.5 mm×10$^{-1}$. The activity based on total catalyst was 5,846 grams per gram catalyst per hour.

EXAMPLE 22

This example demonstrates the use of the catalysts of this invention in a continuous process for the synthesis of ethylene-alpha-olefin copolymer waxes.

The following materials were fed continuously into a pressure reaction vessel.

| | |
| --- | --- |
| Catalyst of Example 1A | 0.19 Gram/Hour |
| AlEt$_3$ | 0.06 Gram/Hour |
| Mineral Spirits | 134.0 Grams/Hour |
| Ethylene | 2,099.0 Grams/Hour |
| Hydrogen | 7.9 Grams/Hour |

The polymerization was conducted at 164° C. and a pressure of 8,720 kPa. The average catalyst residence time was 6.9 hours. After gas and solvent removal, 2,000 grams per hour of polymer was produced with a viscosity of 50 cp at 150° C., a Ring and Ball softening point of 124° C., and a penetration hardness of less than 0.1 mm×10$^{-1}$. The activity based on total catalyst was 1,132 grams per gram catalyst per hour. The yield based on total catalyst was 7,778 grams per gram catalyst per hour.

EXAMPLE 23

This example describes the preparation of a catalyst containing vanadium as the only transition metal. Under an inert atmosphere nine grams of VCl$_4$ and 75 ml of mineral spirits were heated as described in Example 1A. The yield was 5.9 grams of a dark purple to black solid.

EXAMPLE 24

This example demonstrates the use of a catalyst prepared according to this invention containing vanadium as the only transition metal in the preparation of polyethylene waxes. A polymerization of ethylene was carried out as described in Example 11 using 0.1 gram of the catalyst of Example 23 and 0.07 gram of AlEt$_3$. The yield was 463 grams of wax with a viscosity of 465 cp at 150° C. The activity based on total catalyst was 1,513 grams per gram catalyst per hour.

EXAMPLE 25

This example shows that the catalyst of this invention is different from a mixture of VCl$_4$ and TiCl$_4$ reduced by AlEt$_3$:

A solution of 0.069 g of VCl$_4$ and 0.023 g of TiCl$_4$, 38 ml of mineral spirits (V/Ti-mole ratio of 3/1) was treated with 0.079 g of AlEt$_3$ (Al/Ti+V mole ratio is 2/1). The resulting turbid mixture was charged to a reactor with 800 ml of mineral spirits. Ethylene was polymerized using hydrogen as a chain transfer agent as described in Example 11. The activity based on total catalyst was 1316 g/g catalyst/hour. The viscosity of the product was 735 cp at 180° C. The activity of this catalyst is 37% of that obtained in Example 11. The product viscosity also is 21 times that of the product obtained in Example 11.

EXAMPLES 26–30

These examples demonstrate the effect of polymerization temperature on the catalysts of the prior art. Polymerizations were carried out as described in Example 2 using different prior art catalyst and at different temperatures. The results are shown in Table III.

TABLE III

| Example | Catalyst/Catalyst Activator | Polymerization Temp., °C. | Catalyst Activity, g/g total cat./hr. |
|---|---|---|---|
| 26 | 3 Percent TiCl$_4$ on MgCl$_2$/AlEt$_3$ | 200 | 229 |
| 27 | 3 Percent TiCl$_4$ on MgCl$_2$/AlEt$_3$ | 230 | 55 |
| 28 | HA-TiCl$_3$/AlEt$_3$ + LiBu | 200 | 172 |
| 29 | AA-TiCl$_3$/AlEt$_3$ + LiBu | 200 | 108 |
| 30 | TiCl$_4$, VCl$_4$/AlEt$_3$ (Example 25 mixture) | 200 | 1,059 |

The polyolefins prepared by the present invention can be high molecular weight polymers as well as low molecular weight waxes. The high molecular weight polymers can be polyethylene, highly crystalline high molecular weight polypropylene, and copolymers. These high molecular weight polyolefins can be used for forming films, molded articles, coated articles and the like and can be blended with other resinous or elastomeric materials or compounded with pigments, dyes, fillers, stabilizers and the like.

The waxes prepared by the present invention are useful in a wide variety of applications such as cable filling, highway marking, lubricant for use in molding polyvinyl chloride, use in printing inks, rubber compounding and forming color concentrates. The waxes can also be modified as, for example, by oxidation and used in paper coating applications, mold release agents, textile lubricants, polishes and fruit coatings. The higher melt viscosity waxes can also be used as film or be blended with other components to form film or extrusion coatings.

The invention has been described in detail with particular reference to preferred embodiments thereof, but it will be understood that variations and modifications can be effected within the spirit and scope of the invention.

I claim:

1. A process for polymerizing alpha-olefins containing 2 to 14 carbon atoms and mixtures of such alpha-olefins to prepare poly-alpha-olefins having a melt viscosity of from 10 to 2,500,000 cp at 150° C., said process comprising polymerizing such alpha-olefins at a temperature of about 125° C. to about 250° C. with a catalyst containing trialkyl aluminum and a complex of titanium chloride and vanadium halide, said complex being prepared by heating a mixture consisting of titanium tetrachloride and vanadium tetrahalide in a hydrocarbon medium at a temperature of at least 60° C. for at least 0.25 hour, the mol ratio of titanium to vanadium in said mixture being 1/3 to 60/1.

2. A process according to claim 1 wherein said hydrocarbon medium is present during catalyst preparation in 1 to 99 weight percent of the weight of the combined vanadium tetrahalide and titanium tetrachloride.

3. A process according to claim 2 wherein said hydrocarbon medium is mineral spirits.

4. A process according to claim 3 wherein said mineral spirits is present in an amount of 5 to 50 weight percent of the weight of combined vanadium tetrahalide and titanium tetrachloride.

5. A process for polymerizing alpha-olefins containing 2 to 14 carbon atoms and mixtures of such alpha-olefins to prepare poly-alpha-olefins having a melt viscosity of from 10 to 2,500,000 cp at 150° C., said process comprising polymerizing such alpha-olefins at a temperature of about 125° C. to about 250° C. with a catalyst containing trialkyl aluminum and a complex of titanium chloride and vanadium halide, said complex being prepared by heating a mixture consisting of titanium tetrachloride and vanadium tetrahalide in a hydrocarbon medium at a temperature of at least 60° C. to 200° C. for at least 0.25 hour to 6 hours, the mol ratio of titanium to vanadium in said mixture being 1.5/1 to 10/1.

6. A process according to claim 5 wherein said hydrocarbon medium is present during catalyst preparation in 1 to 99 weight percent of the weight of the combined vanadium tetrachloride and titanium tetrachloride.

7. A process according to claim 6 wherein said hydrocarbon medium is mineral spirits.

8. A process according to claim 7 wherein said mineral spirits is present in an amount of 5 to 50 weight percent of the weight of combined vanadium tetrachloride and titanium tetrachloride.

9. A process for polymerizing alpha-olefins containing 2 to 14 carbon atoms and mixtures of such alpha-olefins to prepare poly-alpha-olefins having a melt viscosity of from 10 to 2,500,000 cp at 150° C., said process comprising polymerizing such alpha-olefins at a temperature of about 125° C. to about 250° C. with a catalyst containing trialkyl aluminum and a complex of titanium chloride and vanadium halide, said complex being prepared by heating a mixture consisting of titanium tetrachloride and vanadium tetrahalide in a hydrocarbon medium at a temperature of at least 60° C. to 135° C. for at least 0.5 hour to 2 hours, the mol ratio of titanium to vanadium in said mixture being 1.5/1 to 10/1.

10. A process according to claim 9 wherein said hydrocarbon is present during catalyst preparation in 1 to 99 weight percent of the weight of the combined vanadium tetrachloride and titanium tetrachloride.

11. A process according to claim 10 wherein said hydrocarbon medium is mineral spirits.

12. A process according to claim 11 wherein said mineral spirits is present in an amount of 5 to 50 weight percent of the weight of combined vanadium tetrahalide and titanium tetrachloride.

13. An olefin coordination polymerization catalyst comprising a complex of titanium chloride and vanadium halide, the complex being prepared by heating a mixture consisting of titanium tetrachloride and vanadium tetrahalide in a hydrocarbon medium at a temperature of at least 60° C. for at least 0.25 hour, the mol ratio of titanium to vanadium in said mixture being 1/3 to 60/1.

14. An olefin coordination polymerization catalyst according to claim 13 wherein said hydrocarbon medium is present during catalyst preparation in 1 to 99 weight percent of the weight of the combined vanadium tetrahalide and titanium tetrachloride.

15. An olefin coordination polymerization catalyst according to claim 14 wherein said hydrocarbon medium is mineral spirits.

16. An olefin polymerization catalyst according to claim 15 wherein said mineral spirits is present in an amount of 5 to 50 weight percent of the weight of combined vanadium tetrahalide and titanium tetrachloride.

17. An olefin coordination polymerization catalyst comprising a complex of titanium chloride and vanadium halide, the complex being prepared by heating a mixture consisting of titanium tetrachloride and vanadium tetrahalide in a hydrocarbon medium at a temperature of at least 60° C. to 200° C. for at least 0.25 hour to 6 hours, the mol ratio of titanium to vanadium in said mixture being 1.5/1 to 10/1.

18. An olefin coordination polymerization catalyst according to claim 17 wherein said hydrocarbon medium is present during catalyst preparation in 1 to 99 weight percent of the weight of the combined vanadium tetrahalide and titanium tetrachloride.

19. An olefin coordination polymerization catalyst according to claim 18 wherein said hydrocarbon medium is mineral spirits.

20. An olefin polymerization catalyst according to claim 19 wherein said mineral spirits is present in an amount of 5 to 50 weight percent of the weight of combined vanadium tetrachloride and titanium tetrachloride.

21. An olefin coordination polymerization catalyst comprising a complex of titanium chloride and vanadium halide, the complex being prepared by heating a mixture consisting of titanium tetrachloride and vanadium tetrahalide in a hydrocarbon medium at a temperature of at least 60° C. to 135° C. for at least 0.5 hour to 2 hours, the mol ratio of titanium to vanadium in said mixture being 1.5/1 to 10/1.

22. An olefin coordination polymerization catalyst according to claim 21 wherein said hydrocarbon medium is present during catalyst preparation in 1 to 99 weight percent of the weight of the combined vanadium tetrahalide and titanium compound.

23. An olefin coordination polymerization catalyst according to claim 22 wherein said hydrocarbon medium is mineral spirits.

24. An olefin polymerization catalyst according to claim 23 wherein said mineral spirits is present in an amount of 5 to 50 weight percent of the weight of combined vanadium tetrahalide and titanium compounds.

* * * * *